(12) United States Patent
Virus

(10) Patent No.: US 11,576,344 B2
(45) Date of Patent: Feb. 14, 2023

(54) LIVESTOCK FEEDING DEVICE

(71) Applicant: Kimberly Ann Virus, Omaha, NE (US)

(72) Inventor: Kimberly Ann Virus, Omaha, NE (US)

( * ) Notice: Subject to any disclaimer, the term of this patent is extended or adjusted under 35 U.S.C. 154(b) by 365 days.

(21) Appl. No.: 16/311,834

(22) PCT Filed: Jun. 28, 2017

(86) PCT No.: PCT/US2017/039843
§ 371 (c)(1),
(2) Date: Dec. 20, 2018

(87) PCT Pub. No.: WO2018/005709
PCT Pub. Date: Jan. 4, 2018

(65) Prior Publication Data
US 2019/0274280 A1    Sep. 12, 2019

Related U.S. Application Data

(60) Provisional application No. 62/355,649, filed on Jun. 28, 2016.

(51) Int. Cl.
*A01K 5/01* (2006.01)
*B68B 1/02* (2006.01)
(Continued)

(52) U.S. Cl.
CPC ............... *A01K 5/01* (2013.01); *B68B 1/02* (2013.01); *B68B 1/04* (2013.01); *B68B 5/00* (2013.01); *B68B 5/06* (2013.01)

(58) Field of Classification Search
CPC ........ A01K 5/01; A01K 5/008; A01K 5/0107; A01K 5/0142; A01K 7/005; A01K 5/0135;
(Continued)

(56) References Cited

U.S. PATENT DOCUMENTS

| 494,428 A | 3/1893 | Leonard |
| 979,345 A * | 12/1910 | Shaw ............... A01K 5/008 |
| | | 119/65 |

(Continued)

OTHER PUBLICATIONS

Notification of Transmittal of the International Search Report and the Written Opinion of the International Searching Authority dated Oct. 17, 2017, for App. No. PCT/US17/39843, applicant Kimberly Ann Virus.

*Primary Examiner* — Trinh T Nguyen
(74) *Attorney, Agent, or Firm* — Mallory M. Henninger; Advent, LLP

(57) ABSTRACT

Aspects of the disclosure relate to a livestock feeding device configured to removably attach to a livestock animal (e.g., an equine). The livestock feeding device includes a feed receptacle (e.g., a bucket) configured to retain at least one animal feed product, a lid, and an attachment device. In embodiments, the lid can be configured to extend at least partially around a rim of the feed receptacle, and can comprise at least one flexible flap configured to reduce spillage of the animal feed product retained within the feed receptacle. The feed receptacle and/or the lid can be coupled to the attachment device. In embodiments, the attachment device includes at least one strap configured for attaching the feed receptacle to the livestock animal. In some embodiments, the feeding device further includes one or more ears configured for removably attaching the attachment device to at lid and/or the feed receptacle.

20 Claims, 13 Drawing Sheets

(51) Int. Cl.
  *B68B 1/04* (2006.01)
  *B68B 5/00* (2006.01)
  *B68B 5/06* (2006.01)

(58) Field of Classification Search
  CPC ..... B68B 5/06; B68B 1/02; B68B 1/04; Y10S 119/90; B65D 2543/00805
  USPC .................................................. 220/326, 784
  See application file for complete search history.

(56) References Cited

U.S. PATENT DOCUMENTS

| | | | | |
|---|---|---|---|---|
| 1,018,170 | A | * | 2/1912 | Dombroski ............ A01K 5/008 119/65 |
| 1,033,046 | A | * | 7/1912 | Benton .................. A01K 5/008 119/65 |
| 1,075,764 | A | | 10/1913 | Conradi |
| 1,112,048 | A | * | 9/1914 | Alfano .................. A01K 5/008 119/65 |
| 1,112,941 | A | | 10/1914 | John |
| 1,246,720 | A | * | 11/1917 | Cox ....................... A01K 5/008 119/65 |
| 1,435,404 | A | | 11/1922 | Lloyd |
| 4,576,118 | A | * | 3/1986 | Meadows ............ A01K 5/0114 119/62 |
| 2003/0230244 | A1 | | 12/2003 | Morrison |

\* cited by examiner

LIVESTOCK FEEDING DEVICE

CROSS-REFERENCE TO RELATED APPLICATIONS

The present application claims the benefit under 35 U.S.C. § 119(e) of U.S. Provisional Application Ser. No. 62/355,649, filed Jun. 28, 2017, and titled "LIVESTOCK FEEDING DEVICE," which is herein incorporated by reference in its entirety.

BACKGROUND

Feedbags, or nosebags, are portable bags for feeding horses. Feedbags can be filled with grain or fodder and attached to the head of a horse, enabling it to eat. Feedbags can be used when feeding multiple horses to provide each horse access to its own food supply.

SUMMARY

Aspects of the disclosure relate to a livestock feeding device configured to removably attach to a livestock animal (e.g., an equine). The livestock feeding device includes a feed receptacle (e.g., a bucket) configured to retain at least one animal feed product, a lid, and an attachment device. In embodiments, the lid can be configured to extend at least partially around a rim of the feed receptacle, and can comprise at least one flexible flap configured to reduce spillage of the animal feed product retained within the feed receptacle. The feed receptacle and/or the lid can be coupled to the attachment device. In embodiments, the attachment device includes at least one strap configured for attaching the feed receptacle to the livestock animal. In some embodiments, the feeding device further includes one or more ears configured for removably attaching the attachment device to at lid and/or the feed receptacle.

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

DRAWINGS

The Detailed Description is described with reference to the accompanying figures. The use of the same reference numbers in different instances in the description and the figures may indicate similar or identical items.

DETAILED DESCRIPTION

Figure 1:
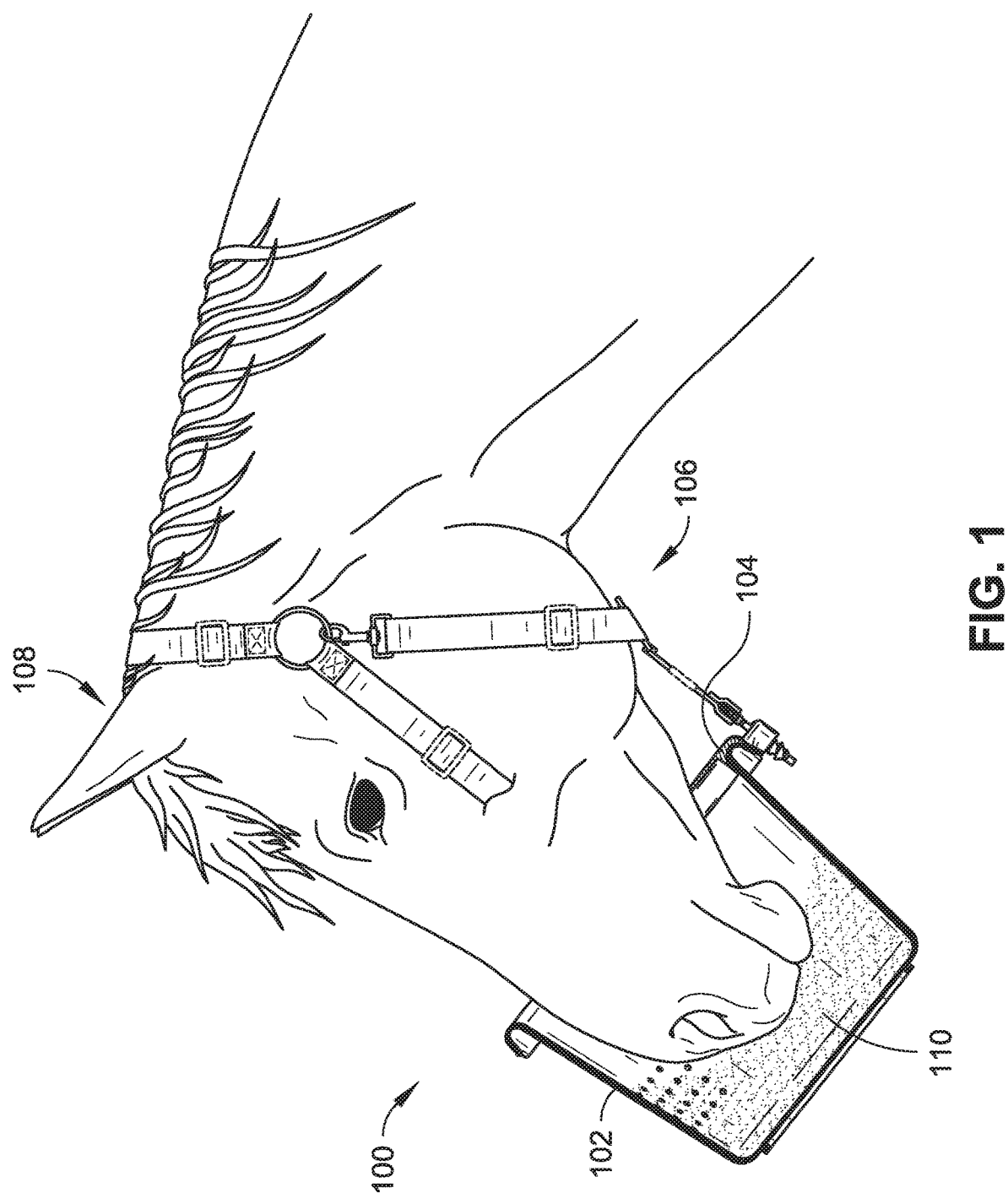
FIG. 1 is a cut away isometric view illustrating a livestock feeding device, as it appears mounted on the head of an equine, in accordance with example embodiments of the present disclosure.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. The following detailed description is, therefore, not to be taken in a limiting sense.

Overview

Feedbags are commonly used to feed animals, particularly livestock animals such as equines (e.g., horses, donkeys, mules, etc.). Feedbags can be used to retain livestock feed products such as grain, feed pellets, fodder, and so forth. The use of a feedbag ensures that each horse has access to a feed source, and controls the amount of feed that each horse receives. While feedbags are most common, feed buckets can also be configured to attach to the horse.

Existing feedbags and feed buckets have several limitations. Feedbags are often formed from cloth-like materials such as leather, canvas, or mesh. While these materials themselves may be somewhat weather resistant, they often fail to protect the enclosed feed product from moisture due to rain or snow. Additionally, cloth feedbags lack durability, as they can be torn, caught on fences, etc. Because feedbags can become easily caught or snagged, they can also become hazardous to the animal. Further, the fabric surfaces of feedbags can be difficult to clean and sanitize adequately. While feed buckets solve some of these drawbacks, forming the feed bucket from a rigid material (e.g., plastic or metal) limits the ability of the bucket to conform to the shape of the horse's head in the same manner as a feedbag. Horses commonly toss their heads while eating, which can result in feed waste if the feedbag/feed bucket does not fit snugly around the muzzle. Most feed buckets cannot both fit snugly around the horse's muzzle to prevent feed waste, while still maintaining breathability. Thus, there is a lack of feedbags that are spill resistant, weather resistant, and durable.

A livestock feeding device is described herein removably attach to a livestock animal (e.g., an equine). The livestock feeding device includes a feed receptacle (e.g., a bucket) configured to retain at least one animal feed product, a lid, and an attachment device. In embodiments, the lid can be configured to extend at least partially around a rim of the feed receptacle, and can comprise at least one flexible flap configured to reduce spillage of the animal feed product retained within the feed receptacle. The feed receptacle and/or the lid can be coupled to the attachment device. In embodiments, the attachment device includes at least one strap configured for attaching the feed receptacle to the livestock animal. In some embodiments, the feeding device further includes one or more ears configured for removably attaching the attachment device to at lid and/or the feed receptacle.

EXAMPLE EMBODIMENTS

Referring generally to FIGS. 1 through 14B, an animal feeding device (e.g., livestock feeding device 100) is described in accordance with example embodiments of the present disclosure. The livestock feeding device 100 includes a feed receptacle (e.g., bucket 102), a lid 104, and an attachment device 106 configured for attaching the feed receptacle to a mammal (e.g., a livestock animal, an equine 108, sheep, cow, goat, etc.).

Figure 2:
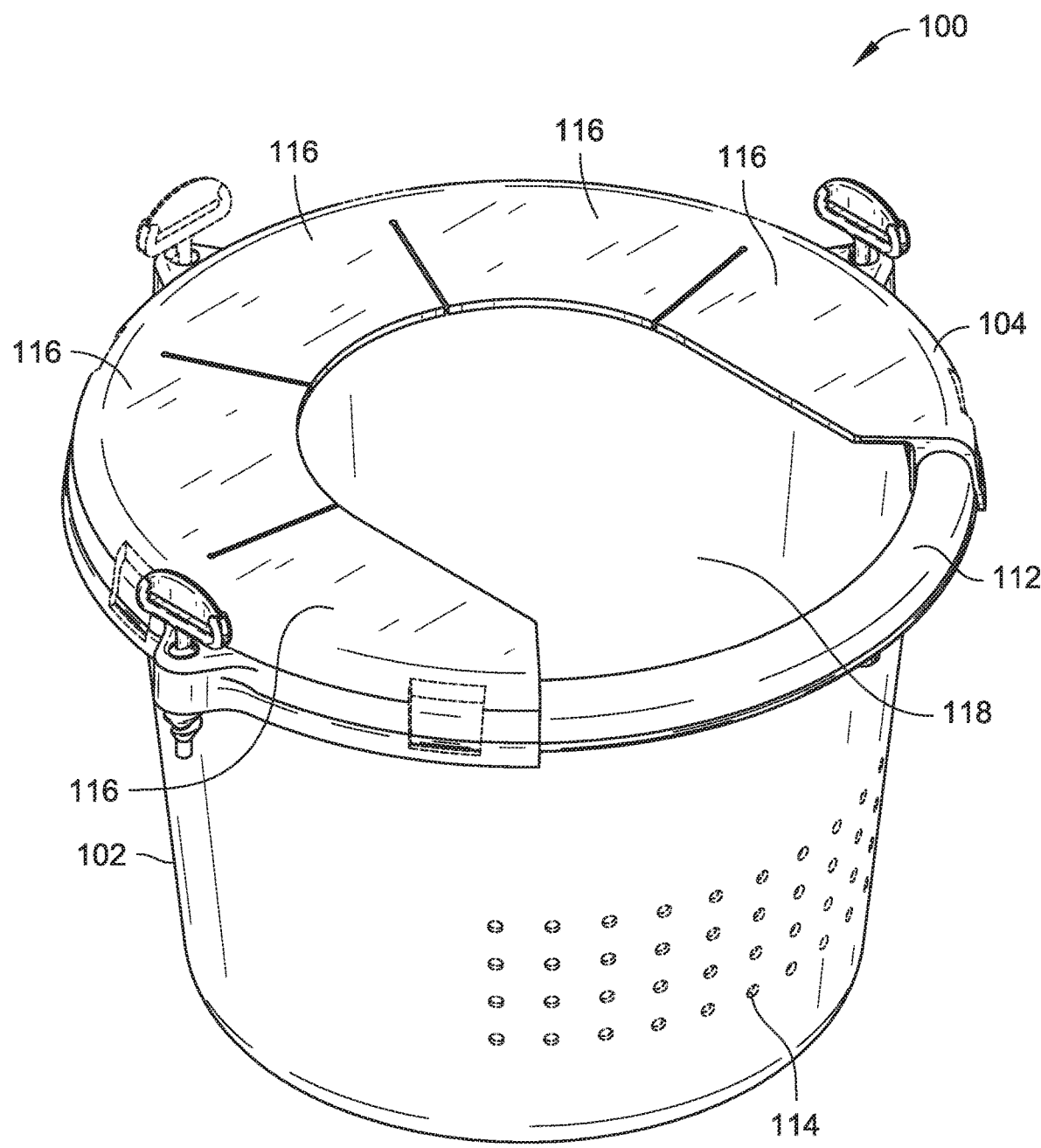
FIG. 2 is an isometric view illustrating a livestock feeding device in accordance with example embodiments of the present disclosure.

Referring now to FIGS. 1 and 2, the feed receptacle can comprise an open-topped container (e.g., bucket 102). The bucket 102 can be configured to retain an animal feed product 110 such as grain, pelleted feed, pelleted supplements, fodder, and so forth. The dimensions of the bucket 102 can be selected so as to provide the equine 108 access to the feed product 110 contained within. The dimensions of the bucket 102 can also be selected based on the desired quantity of feed product to be contained within and the size of the animal to be fed. In an example embodiment, the depth of the bucket 102 can be approximately 8 inches to approximately 15 inches, and the diameter of the bucket 102 can be approximately 9 inches to approximately 15 inches. However, these dimensions are offered by way of example only and are not meant to be restrictive of the present disclosure. In some implementations, the bucket 102 can be composed of a rigid and/or semi-rigid material including, but not necessarily limited to: plastic, polyvinyl chloride (PVC), metal, rubber, synthetic rubber, silicone, and so forth. Forming the bucket 102 from a rigid and/or semi-rigid material can increase the durability of the bucket 102 and protect the feed product contained within from exposure to outside material (e.g., rain, dust, mud, sand, etc.). Further, the use of a rigid and/or semi-rigid material provides a generally nonporous surface that can be quickly and sterilely cleaned, and quickly dried.

In some implementations, the bucket 102 can comprise a cylindrical shape (e.g., as described with reference to FIGS. 1 and 2). However, the use of a cylindrical bucket 102 is offered by way of example only and is not meant to be restrictive of the present disclosure. In other implementations, the bucket 102 can comprise a variety of other shapes: including, but not necessarily limited to ovalular, rectangular, truncated conical, crescent, and so forth. In some implementations, the shape of the bucket 102 can be selected based on the type of animal for which the feeding device will be utilized. For example, a bucket 102 having an ovalular or crescent shape may be used to feed a horse or other equine. The oval or crescent shape can approximate the shape of the horse's muzzle and the way the horse's lips move in a rounded fashion when eating, and can enable the horse to better reach the feed product contained within. In some implementations, the interior of the bucket 102 can be configured to facilitate feed consumption of the animal and/or control the rate of feed consumption. For example, the interior of the bucket can comprise a conical or truncated conical shape, directing the feed product towards the center of the bucket 102 to facilitate access by the animal. In other embodiments, the interior of the bucket 102 can be configured to slow the rate of feed consumption of the animal. For example, a bottom interior surface of the bucket 102 can include one or more cavities and/or grooves configured to direct the feed product into different locations, hindering direct access to the feed product.

Figure 3:
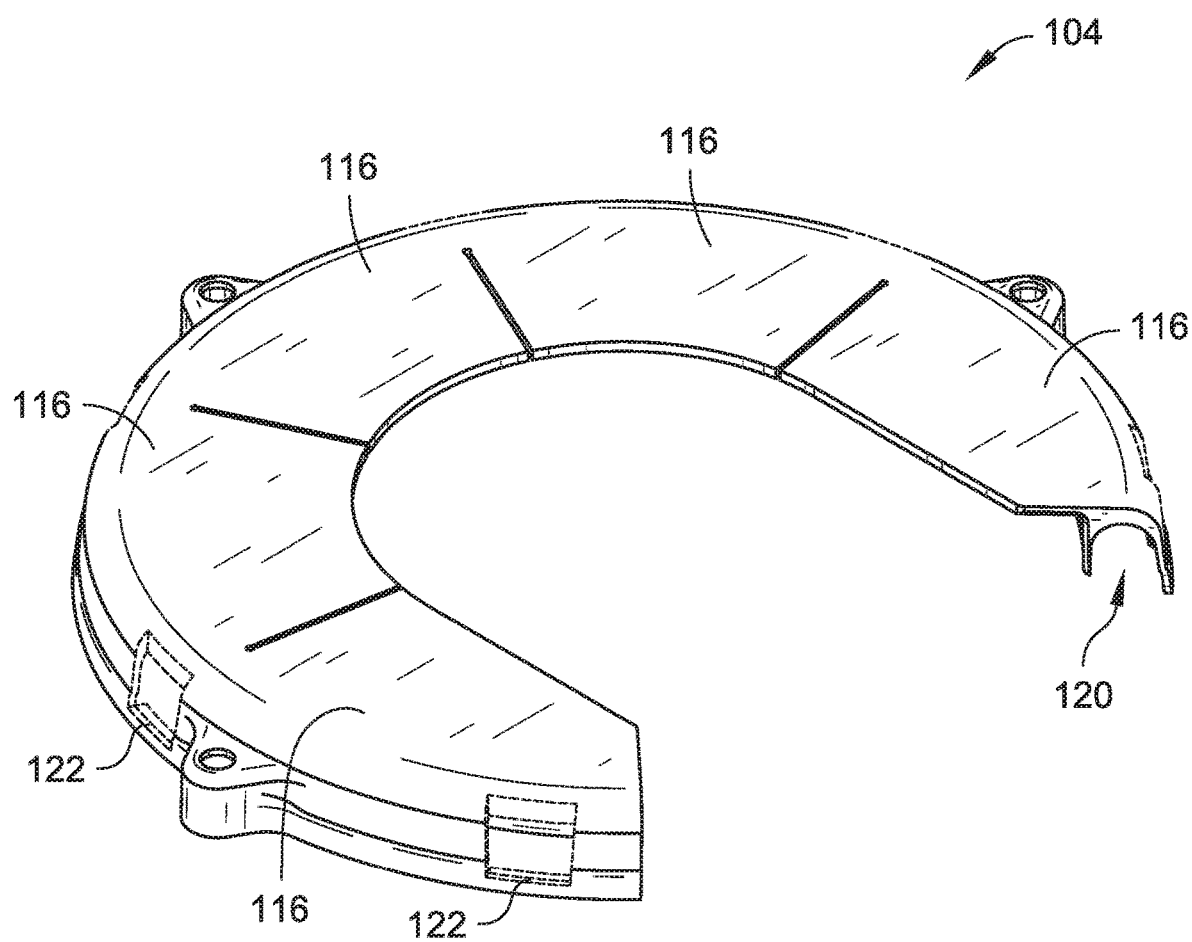
FIG. 3 is an isometric view illustrating the lid of a livestock feeding device, such as the livestock feeding device illustrated in FIG. 1, in accordance with example embodiments of the present disclosure.

The bucket 102 includes a rim 112 that can be coupled to a lid 104, as illustrated in FIGS. 1 through 3. The lid 104 can be configured to extend around the rim 112 (e.g., extend wholly or partially around the perimeter of the bucket 102), partially enclosing a top portion of the bucket 102. In some implementations, the lid 104 can be configured to extend at least partially around the rim 112 (e.g., covering at least a portion of the rim 112). For example, the lid 104 can extend around at least a back portion of the rim 112, to prevent the feed product 110 from spilling out of the back of the bucket 102 (e.g., when the equine 108 tosses its head). Further, by only partially enclosing the bucket 102, the lid 104 reduces feed spillage while maintaining adequate ventilation for the equine 108. The lid 104 can be formed from a variety of materials including, but not necessarily limited to: plastic, PVC, rubber, synthetic rubber, silicone, metal, and so forth.

In some implementations, the bucket 102 can include additional openings to provide increased ventilation for the animal. For example, a front surface of the bucket 102 can include perforations 114 configured to provide additional ventilation, (e.g., as described with reference to FIGS. 1 and 2). In some embodiments, the perforations 114 can be disposed on a surface of the bucket 102 that would cover the equine's 108 nostrils (e.g., as descried with reference to FIG. 1). For example, the perforations 114 can be disposed in lines extending longitudinally across the surface of the bucket 102 covering the horse's nostrils. In other embodiments, the perforations 114 can be positioned on any surface of the bucket 102. The total area occupied by perforations 114 can be significant in terms of its relationship with the overall area of the bucket 102 surface. In some embodiments, the diameter of perforations 114 is selected to be of sufficient size to optimize ventilation, while still maintaining a sufficient total surface area of all the perforations 114 in relation to the bucket 102 surface so as to maintain the necessary rigidity to retain the feed product 110 within. In example embodiments, the perforations 114 can be spaced approximately ⅛ inches to approximately 3 inches apart, and can span approximately ⅛ to approximately, ½ of the surface area of the bucket 102. The diameter of the perforations 114 can also be significant in terms of the relationship to the diameter of the feed product retained within. For example, the diameter of the perforations 114 can be large enough to maintain adequate ventilation for the equine 108, but small enough to prevent leakage of the feed product 110. In example embodiments, each perforation can be approximately 1/16 inches to approximately ½ inches in diameter. However, it is to be understood that these configurations and dimensions of the perforations 114 can vary depending on the factors such as the method of manufacture, material of manufacture, type of feed product 110 to be retained within, and so forth.

In embodiments, the lid 104 includes one or more flexible flaps 116 (e.g., as described with reference to FIGS. 2 and 3). The flexible flaps 116 can be configured to extend around the rim 112 (e.g., extend wholly or partially around the perimeter of the bucket 102), partially enclosing a top portion of the bucket 102. In some implementations, the flexible flaps 116 can be configured to extend at least partially around the rim 112. For example, the flexible flaps 116 can extend inwardly from the rim 112, and can extend around at least a back portion of the rim 112 to prevent the feed product 110 from spilling out of the back of the bucket 102 (e.g., when the equine 108 tosses its head). Further, by only partially enclosing the bucket 102, the flexible flaps 116 reduce feed spillage while maintaining adequate ventilation for the equine 108.

In some implementations, the flexible flaps 116 can be arranged in a semicircular configuration, forming an opening 118 that approximates the shape of the equine's 108 muzzle, as illustrated in FIGS. 1 and 3. The opening 118 permits the equine 108 to access the interior of the bucket 102 and the feed product 110 within. The flexible flaps 116 provide flexibility to enable the equine's 108 muzzle to enter and move within the bucket 102 (e.g., as described with reference to FIG. 1), and to enable the lid 104 to be coupled with the rim 112. In an example embodiment, the lid 104 comprises five flexible flaps 116 joined in a semicircular configuration, as illustrated in FIGS. 2 and 3. However, this configuration is offered by way of example only and is not meant to be restrictive of the present disclosure. In other embodiments, the lid 104 can comprise other quantities and/or arrangements of flexible flaps 116. In implementations, the quantity and arrangement of the flexible flaps 116 can be selected based on the type of animal to be fed. For example, a lid 104 with three flexible flaps 116 that covers a smaller portion of the bucket 102 perimeter can be utilized for animals with a broader muzzle/head (e.g., cow). The size and shape of the flexible flaps 116 can also vary (e.g., based on the size and/or shape of the muzzle/head of the animal to be fed). In example embodiments, the shape of each flexible flap 116 can comprise a trapezoid, a rectangle, triangle, and so forth.

Figure 4:
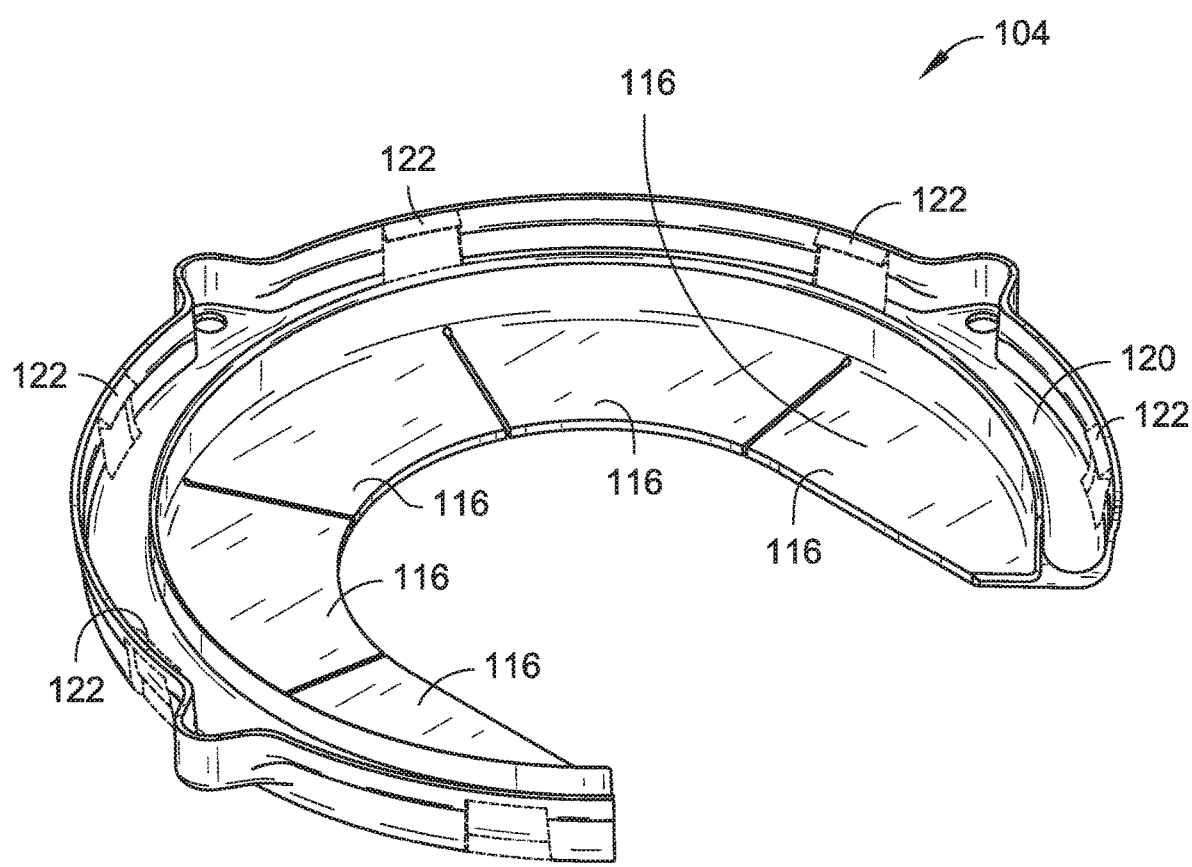
FIG. 4 is a bottom isometric view illustrating the lid of a livestock feeding device, such as the livestock feeding device illustrated in FIG. 1, in accordance with example embodiments of the present disclosure.
Figure 5:
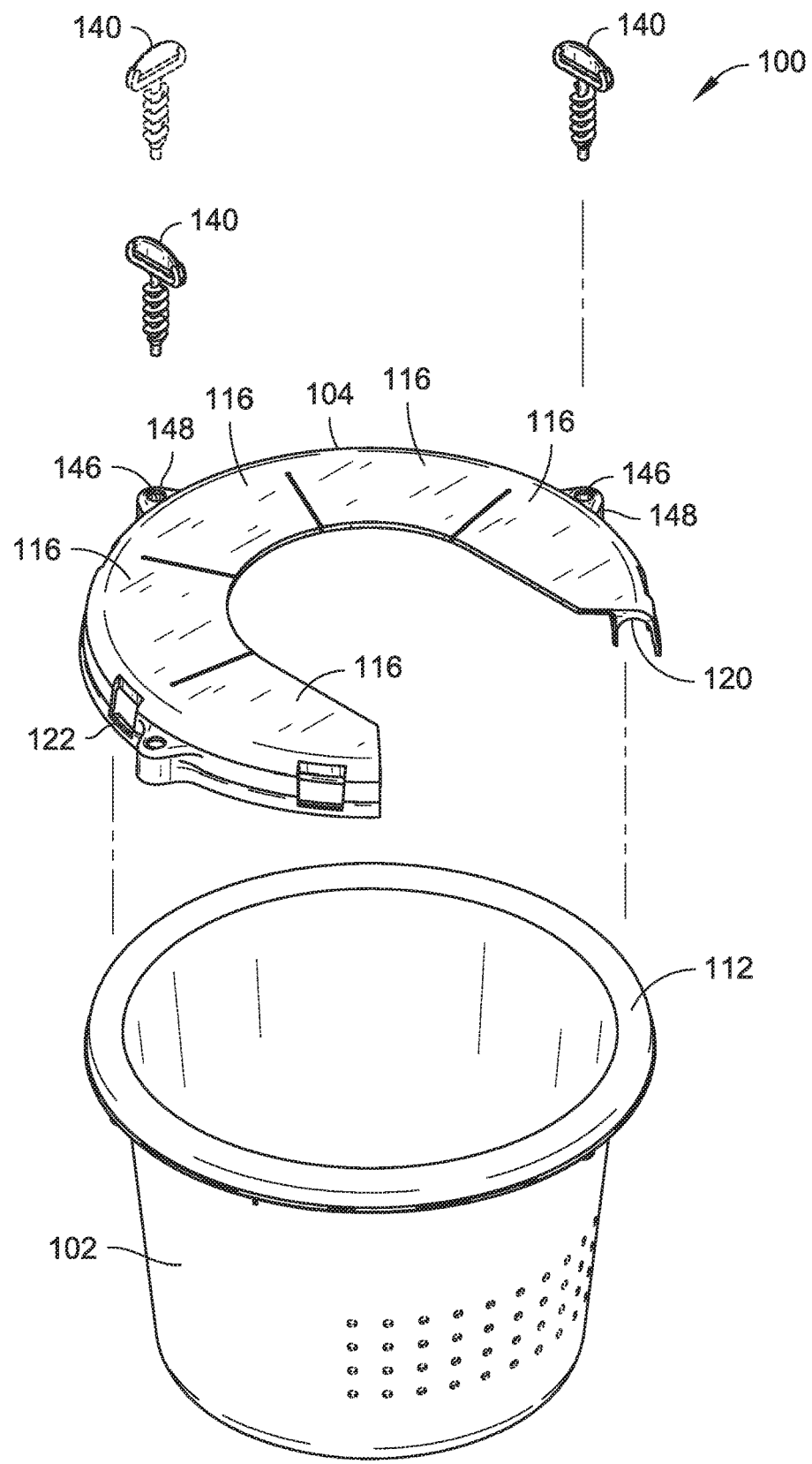
FIG. 5 is an exploded isometric view illustrating a livestock feeding device in accordance with example embodiments of the present disclosure.
Figure 6:
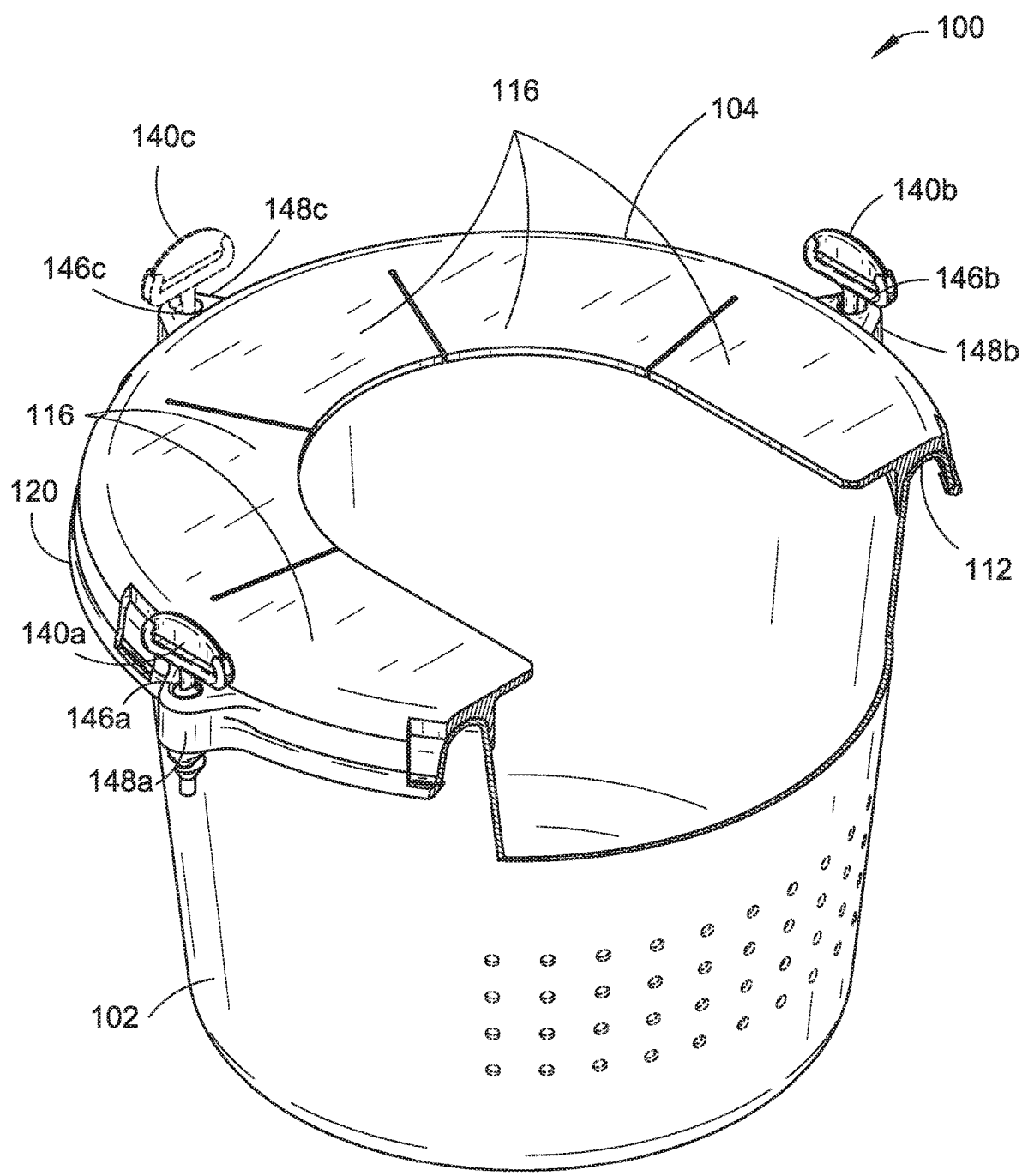
FIG. 6 is a cut away isometric view illustrating a livestock feeding device in accordance with example embodiments of the present disclosure.

In some embodiments, the lid 104 can be removably coupled to the bucket 102. In exemplary embodiments, the lid 104 can include a lip 120 configured to removably attach to the rim 112, as illustrated in FIGS. 4 through 6. For example, the lip 120 can be configured to interlock with the rim 112 of the bucket 102. In some embodiments, the lip 120 may include one or more tabs 122 configured for coupling the lid 104 to the bucket 102. For example, the tabs 122 can be configured for removably engaging (e.g., clipping to, snapping to, etc.) the rim 112. In other embodiments, the lip 120 can include a plurality of grooves configured to mate with corresponding protrusions on the rim 112. For example, the protrusions can extend from a lower portion of the rim 112, and can slidably engage the plurality of grooves.

In other embodiments, at least a portion of the lid 104 can be securely attached to the bucket 102. For example, the lid 104 and/or the flexible flaps 116 can be securely attached the bucket 102 by one or more fasteners. In some embodiments, the fasteners can comprise a variety of fasteners including, but not necessarily limited to: rivets, cap screws, screws, bolts, nails, and so forth. In still other embodiments, the lid 104 and/or the flexible flaps 116 can be formed as a part of the bucket 102 itself (e.g., molded/fused to the bucket 102). For example, at least a portion of the lid 104 can be over-molded directly to the bucket 104. In some embodiments, the lip 120 and/or the flexible flaps 116 can be molded directly to the rim 112. In a specific embodiment, the lip 120 can be molded directly to the bucket 102, and the flexible flaps 116 can be over-molded on the lip 120 and/or the rim 112 (e.g., as described with reference to FIG. 7. In such embodiments, the flexible flaps 116 may or may not be removable. For example, the flexible flaps 116 can include one or more projections configured to engage with (e.g., snap into) corresponding slots of the lip 120 and/or the rim 112.

In some embodiments, the flexible flaps 116 can be formed from a flexible and/or semi-flexible material such as rubber, synthetic rubber, silicone, plastic, metal, and so forth. In some embodiments, the flexible flaps 116 and the lip 120 comprise a single piece of material. In other embodiments, the flexible flaps 116 and the lip 120 comprise separate pieces of material. In a specific embodiment, the flexible flaps 116 are over-molded onto the lip 120. For example, the flexible flaps 116 can comprise a flexible or semi-flexible material (e.g., silicon) that is over-molded onto a lip 120 comprised of a rigid or semi-rigid material (e.g., plastic). When formed as separate pieces of material, the flexible flaps 116 can be configured to couple with the lip 120 and/or the rim 112, as described above. For example, the flexible flaps 116 can include one or more projections configured to engage with (e.g., snap into) corresponding slots of the lip 120 and/or the rim 112.

Referring now to FIGS. 8A through 10, the lid 104 and/or the bucket 102 can be configured to couple with the attachment device 106. In embodiments, the attachment device 106 comprises one or more straps configured for attaching the bucket 102 to an animal. For example, the attachment device 106 can include one or more attachment straps 124 configured for attaching the to the head and/or neck region of the equine 108. In a specific embodiment, the attachment strap 124 can be configured to extend around the poll of an equine 108. In some embodiments, the attachment straps 124 comprise a first attachment strap 124A and a second attachment strap 124B (e.g., as described with reference to FIGS. 8A and 8B). The first attachment strap 124A and the second attachment strap can be 124B configured to extend around opposite sides of the equine's 108 head and removably connect near the equine's 108 poll (e.g., as described with reference to FIG. 9). In some implementations, the attachment device 106 can include one or more fasteners (e.g., buckle 154, snap, separable fastener material, etc.) configured for connecting the first attachment strap 124A and the second attachment strap 124B. In a specific embodiment, the first attachment strap 124A can include a female end of the buckle 154 that is configured to mate with a corresponding male end of the buckle 154 disposed on the second attachment strap 124B. In other embodiments, the attachment strap 124 can comprise a unitary strap.

In some embodiments, the attachment straps 124 can be configured for coupling with a chin attachment 128. For example, the attachment straps 124 can include side rings 126 for coupling with the chin attachment 128 (e.g., as described with reference to FIG. 9). The side rings 126 can be positioned adjacent to the cheek of the equine 108. In exemplary embodiments, the first and second attachment straps 124A,124B can each include a side ring 126A,126B configured for coupling with the chin attachment 128, as described below (e.g., as described with reference to FIGS. 8A and 8B).

The attachment device 106 can further include one or more additional straps configured for attaching the feed receptacle 102 to the equine 108. For example, the attachment device 106 can include a chin attachment 128 (e.g., as described with reference to FIGS. 9 and 10). The chin attachment 128 can be configured to stabilize the bucket 102. The chin attachment 128 can comprise a unitary strap or a plurality of straps. In some embodiments, the chin attachment 128 can include a chin strap 130 configured to extend along the bottom of the equine's 108 muzzle (e.g., from the chin to the throat), and one or more cheek straps 132. For example, the chin strap 126 can be coupled to a first cheek strap 132A and a second cheek strap 132B via a bottom ring 134 positioned adjacent to the bottom side of the equine's 108 throat (e.g., as described with reference to FIGS. 9 and 10). The cheek straps 132A,132B can be configured to couple with the side rings 126A, 126B of the attachment straps 124A,124B. In some embodiments, the cheek straps 132 can couple with the attachment straps 124 via removable fasteners 136 (e.g., as described with reference to FIG. 10). For example, each cheek strap 132A,132B can include a fastener 136A,136B for removably coupling with side rings 126A and 126B, respectively (e.g., as described with reference to FIG. 10). In exemplary embodiments, the fasteners 136A,136B can comprise clips, spring clips, swivels, buckles, and so forth. In other embodiments, the cheek straps 132A,132B can be configured to fixedly attach to the first attachment strap 124A and the second attachment strap 124B, respectively. For example, the cheek straps 132A,132B can be sewn to the first and second attachment straps 124A,124B.

The attachment straps 124, chin strap 130, and/or cheek straps 132 can be formed from a variety of materials such as nylon, rope, leather, and so forth. In some implementations, the length of the attachment straps 124, chin strap 130, and/or cheek straps 126 can be adjustable. For example, the attachment straps 124, chin strap 130, and/or cheek straps 132 can include one or more adjustable fasteners 138 (e.g., adjustable buckles) configured to shorten and/or lengthen the attachment straps 124, chin strap 130, and/or cheek straps 132 to fit animals of different sizes. It is also contemplated that the various components of the attachment device 106 can be coupled other than by rings. It is further contemplated that the attachment straps 124, chin strap 130, and/or cheek straps 132 can include one or more fasteners (e.g., buckle, snap, separable fastener material, etc.) configured to attach to other tack (e.g., bridle, halter, etc.) positioned on the equine 108.

Referring now to FIGS. 5 through 12, the bucket 102 and/or the lid 104 can be removably coupled to one or more ears 140 configured for attaching the attachment device 106 to the lid 104 and/or the bucket 102. In an exemplary embodiment, the livestock feeding device 100 can include a first ear 140A and a second ear 140B configured to couple with attachment straps 124A and 124B, respectively (e.g., as described with reference to FIGS. 8A and 8B). The livestock feeding device 100 can optionally include a third ear 140C configured to couple with the chin attachment 128 (e.g., as described with reference to FIG. 10).

Figure 11A:
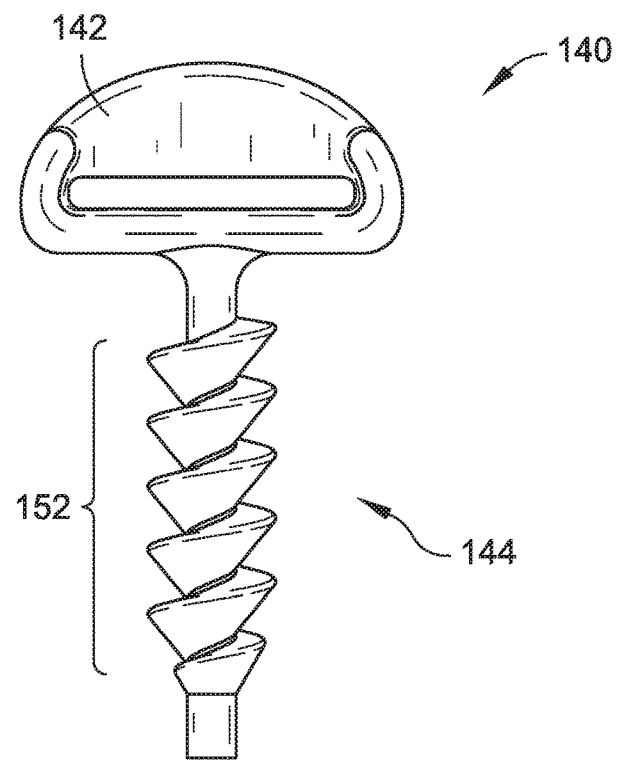
FIG. 11A is a front view illustrating the ear of a livestock feeding device, such as the livestock feeding device illustrated in FIG. 1, in accordance with example embodiments of the present disclosure.
Figure 11B:
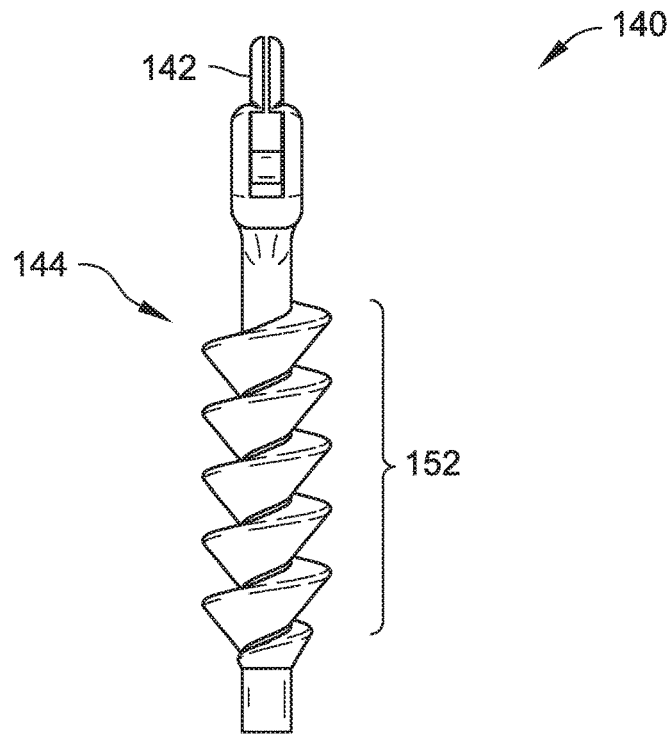
FIG. 11B is a side view illustrating an ear of a livestock feeding device, such as the livestock feeding device illustrated in FIG. 1, in accordance with example embodiments of the present disclosure.
Figure 12:
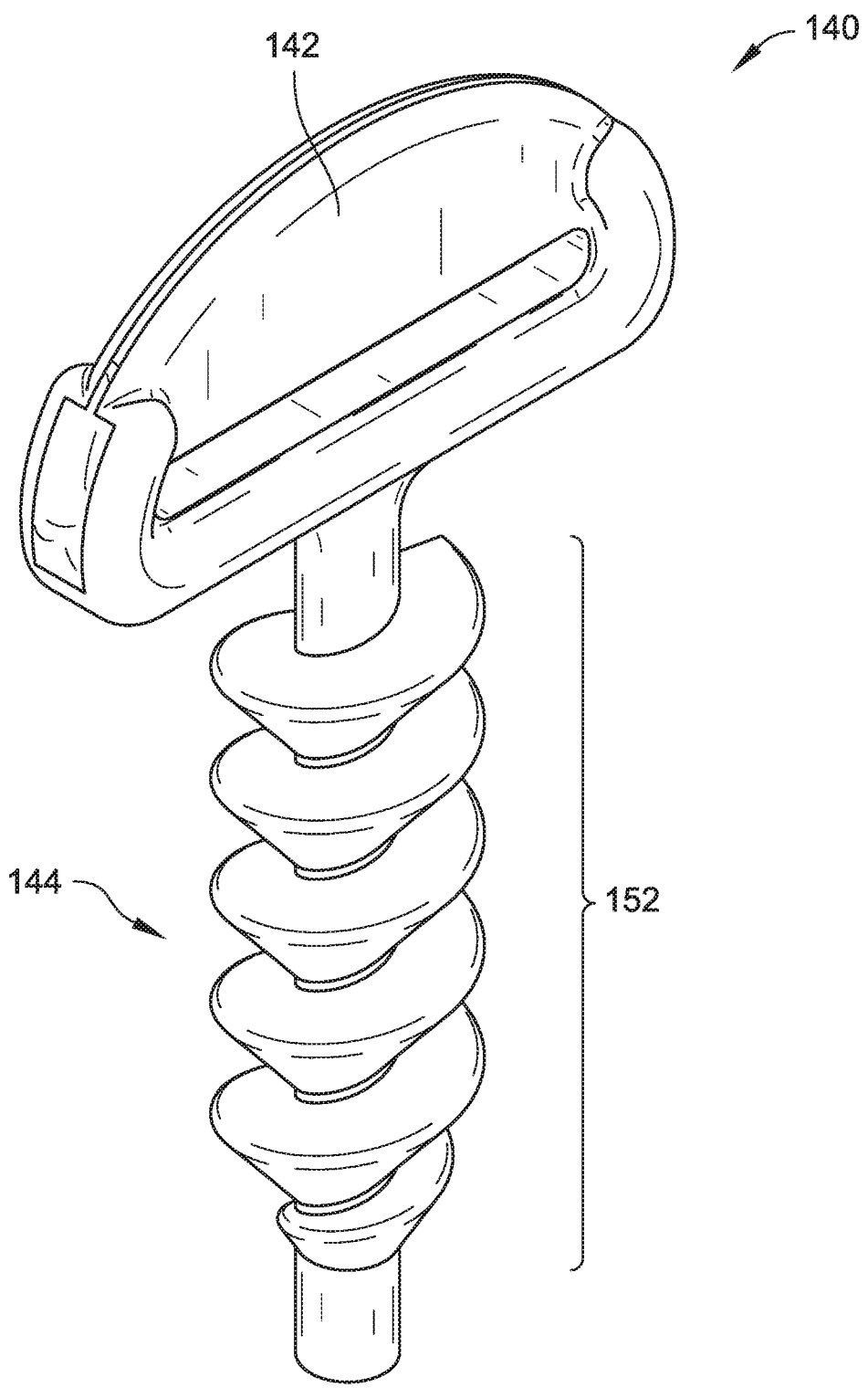
FIG. 12 is a perspective view illustrating an ear of a livestock feeding device, such as the livestock feeding device illustrated in FIG. 1, in accordance with example embodiments of the present disclosure.

In embodiments, the ears 140 can include a first end 142 and a second end 144, as illustrated in FIGS. 11A through 12. The first end 142 can be configured to attach the straps (e.g., attachment straps 124, chin strap 130) of the attachment device 106. The second end 144 can be configured to couple to the bucket 102 and/or the lid 104 (e.g., as described with reference to FIGS. 5 through 7). In some embodiments, the second end 144 can comprise a generally cylindrical or semi-cylindrical connector end extending longitudinally from the first end 142 and configured to engage the bucket 102 and/or the lid 104. In some embodiments, the second end 124 can include a threaded end 152 (e.g., as described with reference to FIGS. 11A through 12). For example, the threaded end can comprise a screw, a bolt, and so forth. The threaded end 152 can be configured to engage a corresponding slot of the lid 104 and/or the bucket 102, as described below. In other embodiments, the second end 144 can include a plurality of parallel protrusions configured to engage a slot of the lid 104 and/or the bucket 102. The ears 140 can be formed from a variety of materials including, but not necessarily limited to: plastic, PVC, metal, rubber, synthetic rubber, silicone, and so forth.

Figure 7:
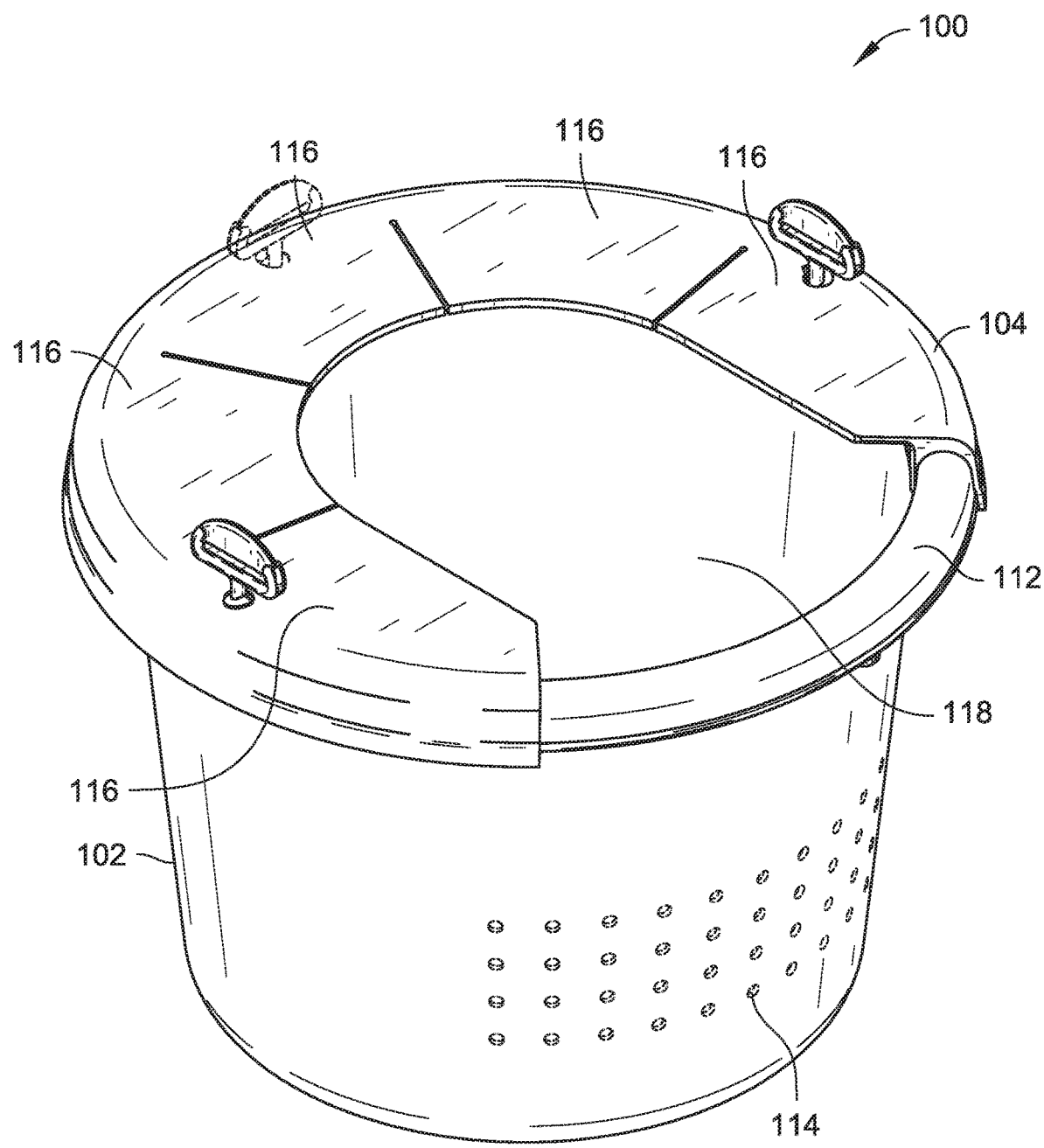
FIG. 7 is an isometric view illustrating a livestock feeding device in accordance with example embodiments of the present disclosure.
Figure 8A:
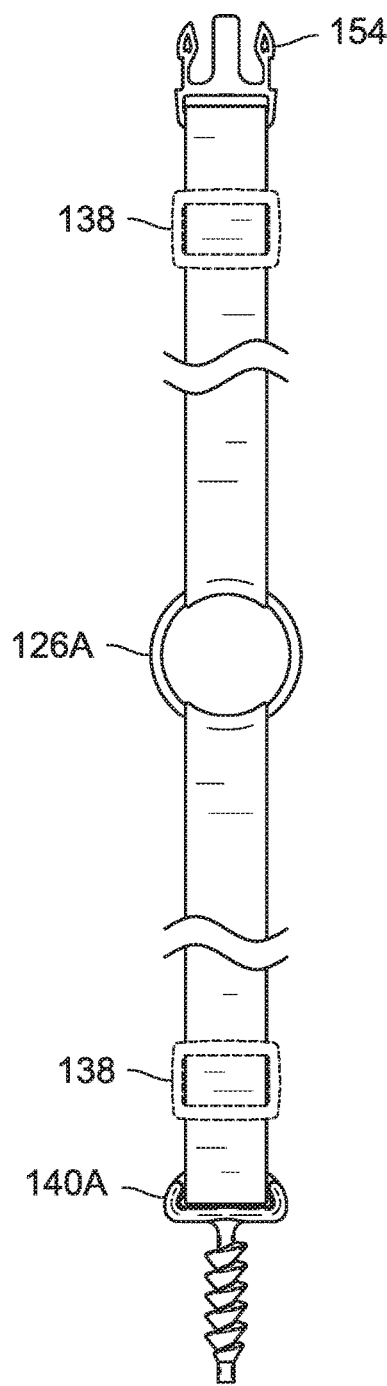
FIG. 8A is a top view illustrating an attachment strap of an attachment device for a livestock feeding device, such as the livestock feeding device illustrated in FIG. 1, in accordance with example embodiments of the present disclosure.
Figure 8B:
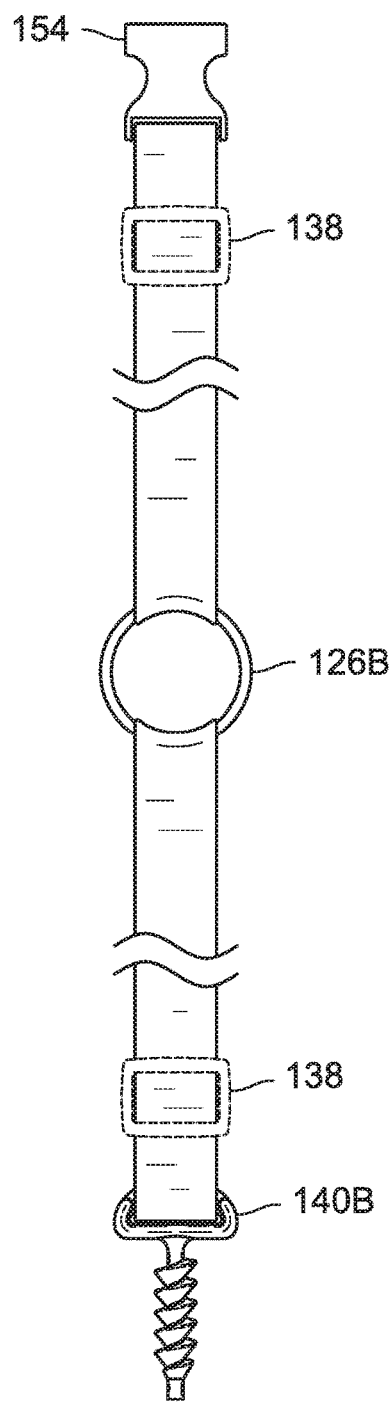
FIG. 8B is another top view illustrating an attachment strap of an attachment device for a livestock feeding device, such as the livestock feeding device illustrated in FIG. 1, in accordance with example embodiments of the present disclosure.
Figure 9:
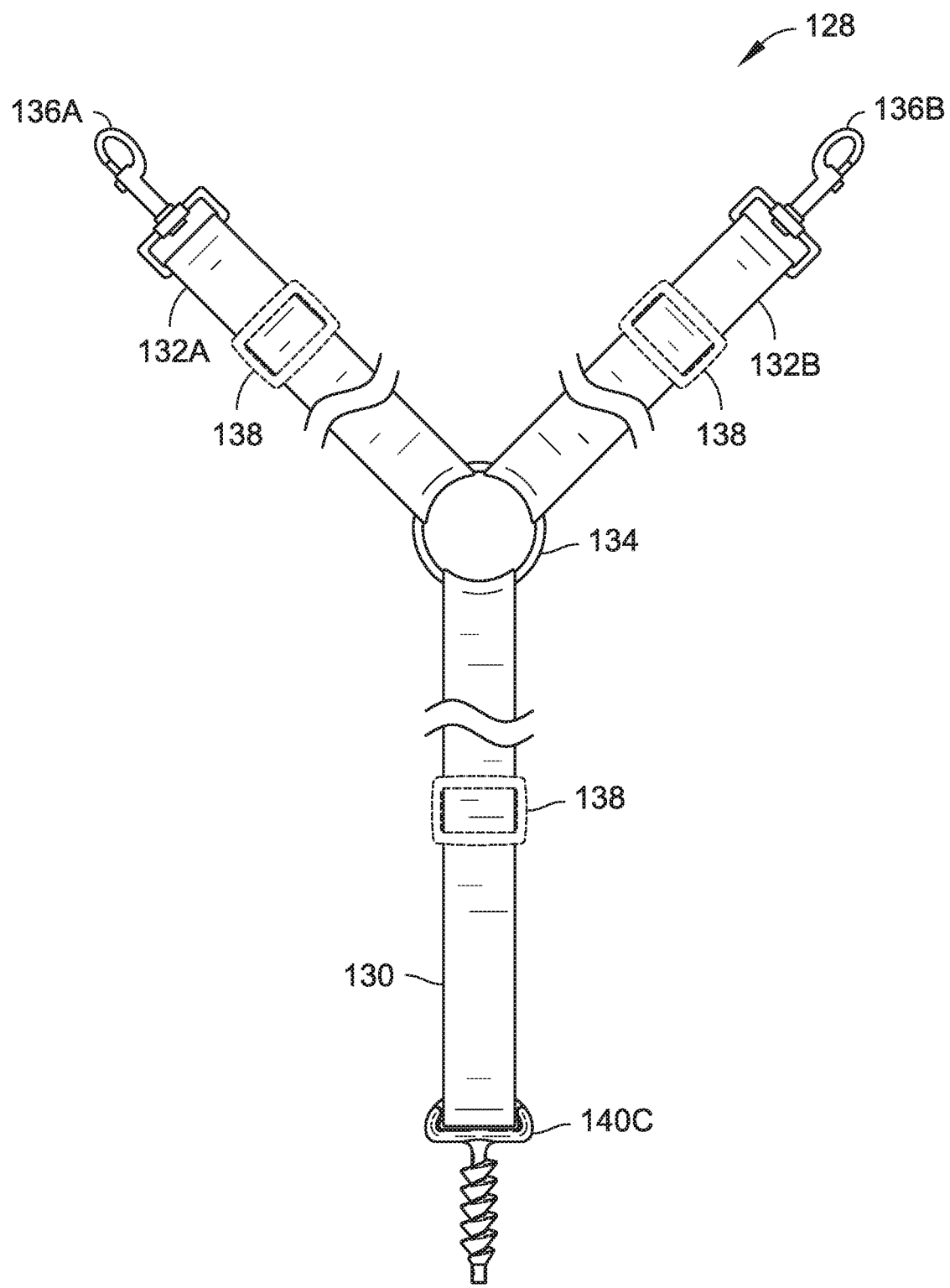
FIG. 9 is a top view illustrating a chin attachment of an attachment device for a livestock feeding device, such as the livestock feeding device illustrated in FIG. 1, in accordance with example embodiments of the present disclosure.

In some embodiments, the bucket 102 and/or the lid 104 can include slots 146 configured to receive the ears 140, as illustrated in FIGS. 5 through 7. The second end 144 of the ear 140 can engage the slots 146. For example, the slots 146 can comprise a ridge configured to receive and retain the threaded ends 152 or parallel protrusions of the ears 140. In other embodiments, the slots 146 can comprise threaded openings configured to mate with the threaded ends 152. In some embodiments, the lip 120 can include one or more protrusions 146 including slot 146 for receiving the bucket ears 140 (e.g., as described with reference to FIGS. 5 and 6). In a specific embodiment, the lip 120 includes a first protrusion 148A and a second protrusion 148B positioned on opposing sides of the outer surface of the lip 120. Each protrusion 148A,148B includes a corresponding slot 146A, 146B configured for receiving ears 140A and 140B, respectively. In some embodiments, the lip 120 can include a third protrusion 148C positioned approximately equidistant between the first and second protrusions 148A,148B. The third protrusion 148C can include a third slot 146C configured for receiving the third ear 140C.

In other embodiments, the slots can be positioned directly a surface of the lid 104 (e.g., directly on the lip 120 and/or the flexible flaps 116), and/or the bucket 102. For example, the bucket 102 can include at least two slots positioned on opposing sides of the upper surface of the bucket rim 112, and the lid 104 can include at least two slots 146 positioned to correspond with the slots of the rim 112 (e.g., as described with reference to FIG. 7). The lid 104 can include at least two slots positioned near an outer edge of the lid 104 and configured to correspond with the slots of the rim 112. In a specific embodiment, the lid 104 includes a first slot 146A and a second slot 146B positioned on opposing sides near the outer edge of the lid 104. Each of slots 146A and 146B are configured for receiving ears 140A and 140B, respectively. In some embodiments, the lid 104 can include a third slot 146C positioned approximately equidistant between the first and second slots 146A,146B. The third slot 146C can be configured for receiving the third ear 140C. The corresponding slot arrangement allows for at least two ears 140 to engage both the bucket 102 and the lid 104.

It is to be understood that these configurations of protrusions 148, slots 146, an/or ears 140 is offered by way of example only and not meant to be restrictive of the present disclosure. In other embodiments, other arrangements and/or quantities of protrusions 148, slots 146, and/or ears 140 can be utilized. It is to be further understood that the use of slots 146 to attach the ears 140 is offered by way of example only and is not meant to be restrictive of the present disclosure. In other embodiments, the ears 140 can be coupled to the bucket by a fastener (e.g., nut, adhesive, etc.). It is also contemplated that the ears 140 can be fixedly secured to the bucket 102 and/or the lid 104. For example, the ears 140 can comprise an extension of the lid 104 and/or bucket 102 (e.g., molded/fused to the bucket 102 and/or lid 104).

Figure 13:
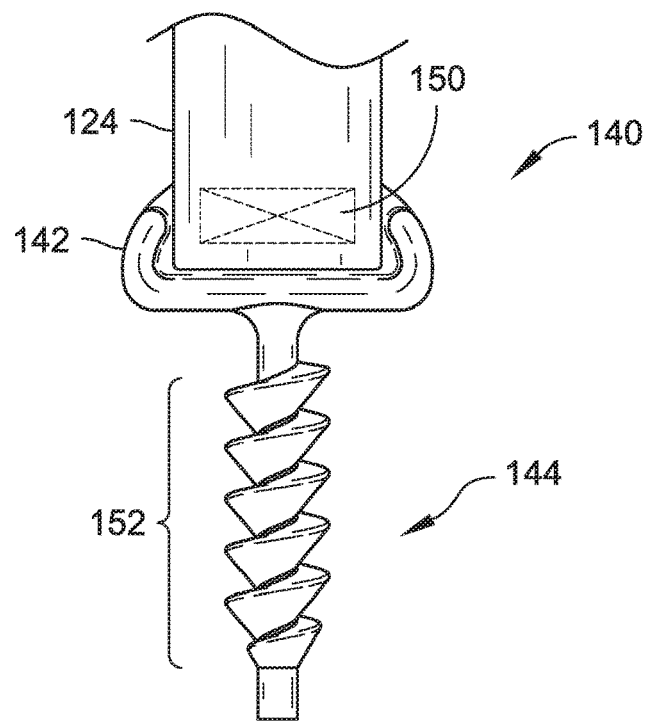
FIG. 13 is a front view illustrating an ear and a strap of a livestock feeding device, such as the livestock feeding device illustrated in FIG. 1, in accordance with example embodiments of the present disclosure.
Figure 14A:
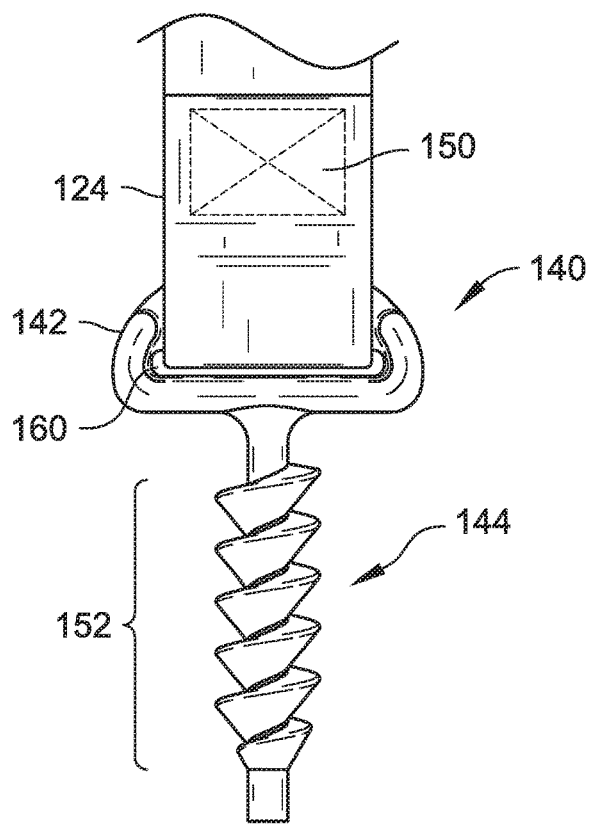
FIG. 14A is a front view illustrating an ear including a opening and a strap of a livestock feeding device, such as the livestock feeding device illustrated in FIG. 1, in accordance with example embodiments of the present disclosure.
Figure 14B:
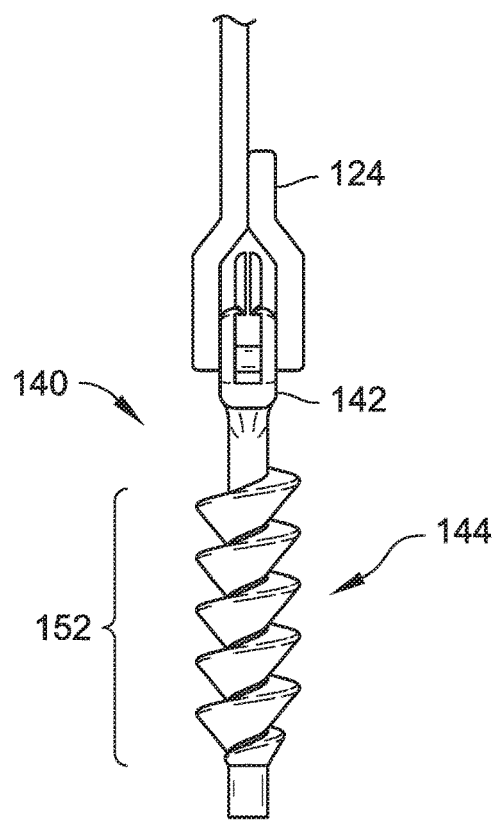
FIG. 14B is a side view illustrating an ear including a opening and a strap of a livestock feeding device, such as the livestock feeding device illustrated in FIG. 1, in accordance with example embodiments of the present disclosure

Referring now to FIGS. 13 through 14B, the ears 140 can be configured to couple with the attachment straps 124 and/or chin strap 130 in a variety of ways. In some embodiments, the attachment strap 124 and/or the chin strap 130 (not shown) can be affixed directly to the ear 140 with a fastener 150 (as described with reference to FIG. 13). In other implementations, the attachment strap 124 and/or the chin strap 130 can be looped through the ear 140 and affixed with a fastener 150 to the attachment strap 124 or the chin strap 130 itself (as described with reference to FIGS. 14A and 14B). For example, the first end 142 of ear 140 can include a slot 160 configured for receiving the attachment strap 124 and/or the chin strap 130. An end of the attachment strap 124 and/or the chin strap 130 can be looped through the slot 160, and the attachment strap 124 and/or the chin strap 130 can be affixed to itself via the fastener 150. A variety of fasteners 150 can be used, including but not necessarily limited to: stitching, adhesive, a separable fastener material (e.g., Velcro®), a rivet, and so forth. Alternatively, the attachment strap 124 and/or the chin strap 130 can be tied (e.g., knotted) to the ear 140. Further, it is to be understood that while the attachment strap 124 and/or the chin strap 130 can be coupled to the ears 140 as described herein, in other embodiments, the strap may be coupled directly to the bucket 102 and/or the lid 104.

In some implementations, the ears 140 and/or the strap 126 can be removably coupled to the bucket 102 and/or the lid 104. For example, the ears 140 can comprise breakaway ears 140 configured to securely attach to the bucket 102 and/or lid 104 when a first force is applied to the ear 140 in a first direction (e.g., such as when a user pushes the ear 120 into the slot 146), and to release from the bucket 102 and/or lid 104 when a force is applied to the ear 140 in a second direction generally opposite the first direction (e.g., when the equine 108 pulls against the attachment strap 124 and/or the chin strap 130; if the equine 108 becomes caught on an element in the environment that applies pressure to the attachment strap 124 and/or the chin strap 130). For example, the threaded end 152 and/or parallel protrusions of the second end 144, described above, can be configured to interlock with the slots 146 (e.g., as described with reference to FIGS. 5 through 7). When the equine 108 twists or pulls against the attachment straps 124 and/or the chin strap 114, the ears 140 can rotate within the slots 146, allowing the threaded end 152 or parallel protrusions to release from the slots 146. In other embodiments, the attachment device 106 can be configured to release from the equine 108 and/or the bucket ears 140. The attachment straps 124 and/or the chin strap 130 can be configured to release from the equine 108 and/or the ears 140 when then equine 108 twists or pulls against the attachment straps 124 and/or the chin strap 130, while the ears 140 remain stationery. For example, the attachment straps 124 and/or the chin strap 130 can include a breakaway buckle configured to release when the animal twists or pulls against the attachment straps 124 and/or the chin strap 130. Utilizing a breakaway ear 140, attachment strap 124 and/or the chin strap 130 can prevent the bucket 102 from becoming hazardous to the equine 108 (e.g., if the equine 108 is caught on fencing, wire, trees, etc.), while keeping the bucket 102 securely attached to the equine 108 when the animal is not in distress.

In some embodiments, the livestock feeding device 100 can be customizable in a variety of ways to suit the preferences and needs of the user and/or the equine 108 or other animal to be fed. For example, the bucket 102, lid 104, ears 140, and/or attachment device 106 can be formed in a variety of colors to fit the preferences of the user and/or to facilitate organization of multiple livestock feeding devices 100. The livestock feeding device 100 and/or any of its components can also be formed in a variety of sizes based on the type of animal (e.g., equine 108, bovine, sheep, goat, etc.) to be fed, the size of the animal to be fed (e.g., horse, pony, miniature horse, etc.) and/or the amount of feed product 110 required by the animal. In some embodiments, the livestock feeding device 100 can include one or more labels. For example, the label can be permanently and/or removably attached to an exterior surface and/or an interior surface of the bucket 102. The label can also be removably and/or permanently attached to the lid 104 and/or strap 124. The user can utilize the label to record the name of the animal, feed rations, and/or other information about the animal. The use of labels and/or livestock feeding devices 100 of different colors can also enable users feeding multiple animals to ensure that each animal receives its designated livestock feeding device 100. Providing each animal with a designated livestock feeding device 100 can help to ensure that each animal receives the proper amount of feed product 110, and can reduce the transmission of bacteria and disease.

It is to be understood a feed receptacle that comprises a bucket 102, as shown in FIGS. 1 through 14B, is offered by way of example only and is not meant to be restrictive of the present disclosure. Those skilled in the art will appreciate that the feed receptacle can comprise other types of rigid or semi-rigid containers such as a box, tub, bin, and so forth.

Figure 10:
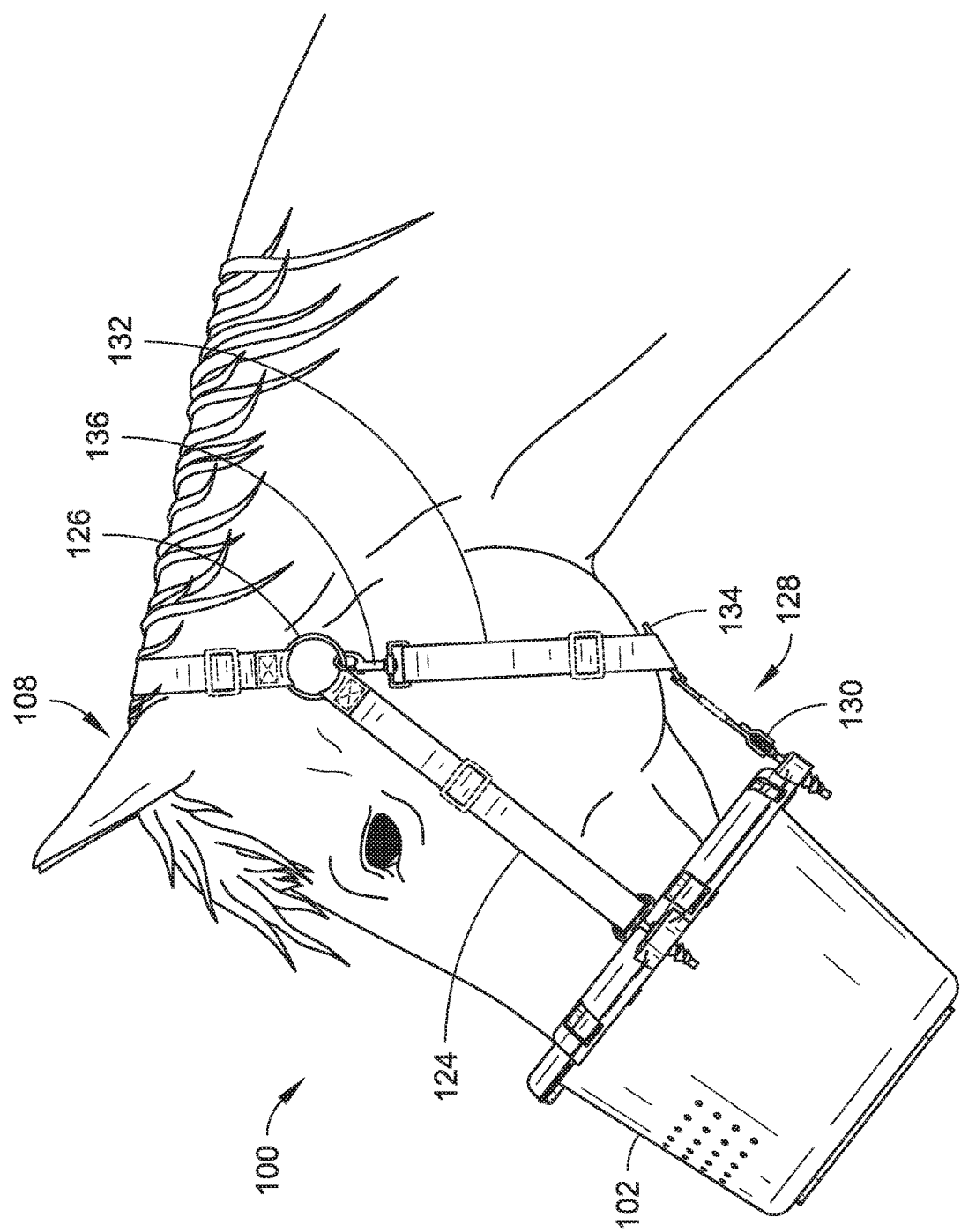
FIG. 10 is an isometric view illustrating a livestock feeding device, as it appears mounted on the head of an equine, in accordance with example embodiments of the present disclosure.

It is to be further understood that a livestock feeding device 100 for an equine 108, as shown in FIGS. 1 and 10, is offered by way of example only and is not meant to be restrictive of the present disclosure. Those skilled in the art will appreciate that the feeding device can be utilized with many types of livestock or other mammals.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A livestock feeding device, comprising:
   a feed receptacle, the feed receptacle configured to retain at least one animal feed product, the feed receptacle having a rim formed of at least one of a rigid or a semi-rigid material;
   a lid configured to extend at least partially around the rim of the feed receptacle, the lid comprising a plurality of flexible flaps configured to reduce spillage of the at least one animal feed product from the feed receptacle, the lid having a planar top region configured to sit atop the rim of the feed receptacle, the lid defining an open area around a center of the lid the plurality of flexible flaps extending contiguously from the planar top region of the lid toward the open area and the center of the lid, the plurality of flexible flaps defined by a plurality of divisions in the lid extending radially from the center of the lid; and
   an attachment device coupled to at least one of the feed receptacle or the lid, the attachment device comprising at least one strap configured for attaching the feed receptacle to a mammal.

2. The livestock feeding device as recited in claim 1, wherein the feed receptacle comprises a bucket.

3. The livestock feeding device as recited in claim 1, wherein the feed receptacle is formed from at least one of plastic, polyvinyl chloride, rubber, synthetic rubber, or metal.

4. The livestock feeding device as recited in claim 1, further comprising at least one ear coupled to the attachment device, the at least one ear configured for removably attaching the attachment device to at least one of the feed receptacle or the lid.

5. The livestock feeding device as recited in claim 1, wherein the plurality of flexible flaps is arranged in a semicircular configuration.

6. The livestock feeding device as recited in claim 4, wherein at least one of the feed receptacle or the lid includes at least one slot configured to receive the at least one ear.

7. The livestock feeding device as recited in claim 1, wherein the feed receptacle includes a plurality of perforations configured to provide ventilation for the mammal.

8. An equine feeding device, comprising:
   a feed receptacle, the feed receptacle configured to retain at least one animal feed product, the feed receptacle having a rim formed of at least one of a rigid or a semi-rigid material;
   a lid configured to extend at least partially around the rim of the feed receptacle, the lid comprising a plurality of flexible flaps configured to reduce spillage of the at least one animal feed product from the feed receptacle, the lid having a planar top region configured to sit atop the rim of the feed receptacle, the lid defining an open area around a center of the lid the plurality of flexible flaps extending contiguously from the planar top region of the lid toward the open area and the center of the lid, the plurality of flexible flaps defined by a plurality of divisions in the lid extending radially from the center of the lid;
   an attachment device coupled to at least one of the feed receptacle or the lid, the attachment device comprising at least one strap configured for attaching the feed receptacle to an equine; and
   at least one ear coupled to the attachment device, the at least one ear configured for removably attaching the attachment device to at least one of the feed receptacle or the lid.

9. The equine feeding device as recited in claim 8, wherein the feed receptacle comprises a bucket.

10. The equine feeding device as recited in claim 8, wherein the feed receptacle is formed at least one of plastic, polyvinyl chloride, or metal.

11. The equine feeding device as recited in claim 8, wherein the at least one ear is removably coupled to the at least one of the feed receptacle or the lid, the at least one ear configured to securely attach to the at least one of the feed receptacle or the lid when a first force is applied to the at least one ear in a first direction, and detach from the at least one of the feed receptacle or the lid when a force is applied to the at least one ear in a second direction that is generally opposite the first direction.

12. The equine feeding device as recited in claim 8, wherein the plurality of flexible flaps is arranged in a semicircular configuration.

13. The equine feeding device as recited in claim 8, wherein at least one of the feed receptacle or the lid includes at least one slot configured to receive the at least one ear.

14. A lid for a livestock feed receptacle, the lid defining an open area around a center of the lid, the lid comprising:
   a plurality of flexible flaps coupled to a lip, the lip configured to couple with a feed receptacle having a rim formed of at least one of a rigid or a semi-rigid material, the plurality of flexible flaps configured to extend at least partially around the rim of the feed receptacle and to reduce spillage of at least one animal feed product retained in the feed receptacle the lip having a planar top region configured to sit atop the rim of the feed receptacle, the plurality of flexible flaps extending contiguously from the planar top region of the lip toward the open area and the center of the lid, the plurality of flexible flaps defined by a plurality of divisions in the lid extending radially from the center of the lid; and
   an attachment device, the attachment device comprising at least one strap configured for attaching the feed receptacle to a mammal, the attachment device coupled to at least one of the lip or the plurality of flexible flaps by at least one ear.

15. The lid as recited in claim 14, wherein the plurality of flexible flaps is formed from at least one of plastic, polyvinyl chloride, rubber, synthetic rubber, silicone, or metal.

16. The lid as recited in claim 14, wherein the at least one ear is removably coupled to the at least one of the lip or the plurality of flexible flaps, the at least one ear configured to securely attach to the at least one of the feed receptacle or the lid when a first force is applied to the at least one ear in a first direction, and detach from the at least one of the feed receptacle or the lid when a force is applied to the at least one ear in a second direction that is generally opposite the first direction.

17. The lid as recited in claim 14, wherein the plurality of flexible flaps is arranged in a semicircular configuration.

18. The lid as recited in claim 14, wherein at least one of the plurality of flexible flaps includes at least one slot configured to receive the at least one ear.

19. The lid as recited in claim 14, wherein the lip includes at least one tab configured for coupling the lid to the feed receptacle.

20. The lid as recited in claim 14, wherein the at least one strap comprises at least one attachment strap configured for coupling the feed receptacle to at least one of a head region or a neck region of the mammal, and at least one additional strap coupled to the at least one attachment strap, the at least one additional strap configured to stabilize the feed receptacle.

* * * * *